May 5, 1953 C. GRADO 2,637,266
STEAM COFFEE MAKER
Filed May 7, 1949
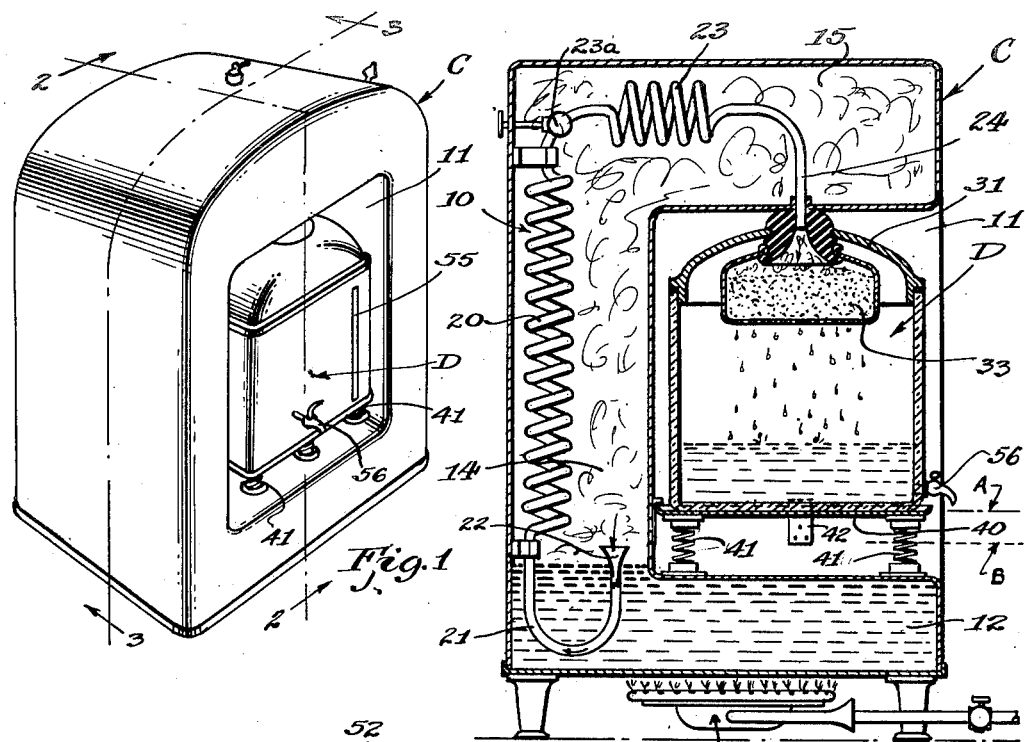
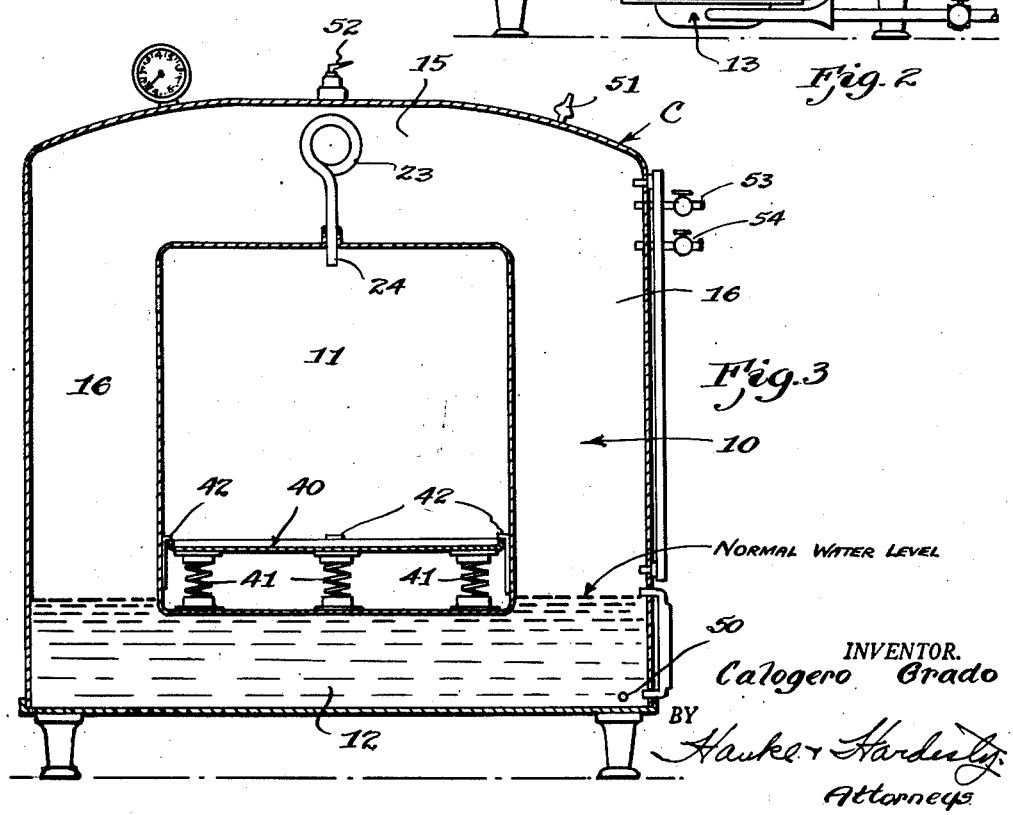
INVENTOR.
Calogero Grado
BY Hauke & Hardy
Attorneys Patented May 5, 1953

2,637,266

UNITED STATES PATENT OFFICE 2,637,266

STEAM COFFEE MAKER

Calogero Grado, San Diego, Calif.

Application May 7, 1949, Serial No. 91,947

2 Claims. (Cl. 99—293)

My invention relates to a coffee maker, and more particularly to that type which comprises an apparatus constructed to generate a supply of steam, preferably superheated steam, and which conveys or conducts the steam to a coffee urn, removably supported by said apparatus.

In similar coffee makers, it has been the practice heretofore to make semi-permanent connections with the urn so as to make it possible to introduce steam into the urn, and such coffee makers are not readily adaptable to the manufacture in multiple sizes, or to a construction where the coffee urn can be readily removed as desired.

It is an object of my present invention to provide an improved coffee maker of the character described by constructing an apparatus which comprises a removable coffee urn, supported on a spring biased support in such a way as to facilitate the connection of the urn to a source of steam supply, and further to provide a novel arrangement by the construction of an apparatus embodying a steam generating instrumentality provided with a steam chest or compartment provided with an urn recess so arranged as to compactly encompass the coffee urn when disposed in the recess.

For a more detailed understanding of my invention, reference may be had to the accompanying drawing illustrating a preferred embodiment thereof in which like parts are referred to by like reference characters throughout the several views, and in which Fig. 1 is a perspective view of my improved coffee maker.

Fig. 2 is a vertical sectional view thereof taken substantially on the line 2—2 of Fig. 1, and Fig. 3 is a sectional view in a plane normal to Fig. 2 and taken substantially on the line 3—3 of Fig. 1.

The coffee maker as herein illustrated may obviously be made in various sizes having a capacity of a few cups for domestic applications or many cups for commercial applications.

The preferred embodiment of my invention comprises a main structure C, preferably constructed of sheet metal and formed to provide a combined water and steam compartment 10, which is recessed as shown at 11 to receive a coffee urn D. It will be noted that the water is collected in the bottom of the compartment (see Figs. 2 and 3) which portion, described by the reference character 12, is employed to heat the water, such as a burner 13 of conventional construction, and is of a type which will boil the water and convert a substantial part of same to steam, which is confined in the closed compartment C, the steam filling the compartment portion 14 disposed to the rear of the recess, the upper portion 15 which overhangs the urn recess and those portions 16, which are disposed to the side of the urn recess. Thus the urn recess is substantially encompassed by the steam compartment, which surrounds all sides thereof with the exception of the open front.

A steam coil 20 is supported within the compartment, and if desired a plurality of such coils may be employed. One end of the coil terminates in a loop 21 which is immersed in the water and return bent in such a manner as to provide an inlet 22 disposed preferably just above the normal high water level (see Fig. 2). The coil preferably extends vertically in the upright compartment portions and is connected in series with a coil portion 23 disposed in the upper portion 15 of the compartment and terminates in an outlet nozzle 24, which is projected through the top wall of the urn recess.

A one way check valve 23a is connected in series with the steam coil 20 and is employed to prevent the escape of heat from the urn into the system. After the coffee is made, the valve 23a is shut off and the coffee in the urn will stay hot for many hours after the burner is turned off. Thus a pressure builds up in the compartment due to the generation of steam therein, the steam is forced into the coils and fed to the outlet, said steam being thus somewhat superheated.

The coffee urn "D" comprises a body portion 30 constructed, if desired, of insulated wall sections, or of a suitable material resistant to the transmission of heat. A cover assembly 31 closes the upper open top of the urn and carries a compressible and yielding inlet fixture 32, which fixture also supports a container 33 in which ground coffee is placed, said container being disposed immediately below the inlet fixture 32. This inlet fixture is provided with a central bore or hole into which the outlet nozzle 24 is thrust, so that the steam discharged therefrom is directed into the container 33, said container being perforated as at 34, so that the condensed steam after extracting the oils of the coffee may drip into the urn.

The coffee urn D is supported on the spring biased support or platform 40, suitable spring means, such as coils 41 being utilized to yieldingly support the platform 40. Stops 42 serve to limit the upward travel of the platform 40, this limit of travel being generally indicated at "A," and the platform may be depressed or lowered to the level indicated generally at "B," so as to permit easy removal or assembly of the urn in the recess 11. The force of these compression springs 41 is such as to urge the compressible and yielding inlet fixture 32 against the roof or top wall of the recess to effectively seal the connection with the outlet nozzle, said fixture being preferably constructed so that same will yieldingly grip the outlet nozzle.

Obviously, after the burner 13 is turned off, the generation of steam is stopped, and such steam as remains in the compartment will condense and return to water. Further water may be added if desired until the level of the water rises above the inlet 22 and thus the water will overflow into the loop 21 and act to seal against the escape of any steam left in said compartment. When the apparatus is placed in operation again, the boiling of the water will soon lower the level of the water below the inlet and steam under pressure will once again flow through the coils and thence into the urn.

A valved water outlet 50 may be coupled with the apparatus, and it is obviously desirable to provide suitable gauges and indicating devices to indicate the level of water in the compartment as well as the steam pressure. An automatic pressure relief valve 51 is desirable as well as a manually actuated emergency valve 52. Steam may be exhausted through a valved outlet 53 and water may be added through a valved inlet 54. Preferably the coffee urn is provided with a liquid level indicator 55 and an outlet faucet 56 of conventional construction.

It will be apparent to those skilled in the art to which my invention pertains that various changes and modifications may be made without departing from the spirit of my invention or from the scope of the appended claims.

I claim:

1. A coffee maker comprising a rectangular casing providing a combined water and steam compartment and having an urn recess in the front wall thereof, a coffee urn removably supported in said recess, said water and steam compartment enclosing the side, back, top and bottom walls of said urn recess, and a steam coil disposed in said compartment above the normal water level and having an inlet U-shaped connection immersed in said water and provided with an inlet adjacent to but above the water level, said steam coil having a portion thereof disposed in said compartment to the rear of said urn recess and another portion disposed in the compartment above the top wall of said urn recess and terminating in an outlet elbow extending through the top wall of said urn recess, said coffee urn having a compressible and yielding inlet fixture adapted to be detachably connected with the outlet connection of the steam coil, said side, back, top and bottom walls of said coffee urn disposed to lie closely adjacent to the walls of said urn recess and subjected to heat radiating from the walls of said recess to maintain the coffee in said urn at a usable hot temperature.

2. A coffee maker comprising a steam compartment, means for generating steam and circulating same through said compartment, said compartment provided with an urn recess substantially surrounded on the back, side, top, and bottom walls by said compartment, a coffee urn fitted within said recess and having the sides, back, top and bottom walls thereof disposed to lie closely adjacent to the walls of said urn recess and subjected to heat radiating from said compartment, a yieldingly supported platform fixture, said compartment having a steam outlet nozzle projecting through the top wall of the urn recess and adapted for quick attachment to the inlet fixture of said coffee urn, said yielding means supporting said platform on which said coffee urn is supported acting to yieldingly maintain the connection between the steam nozzle and the inlet fixture, said inlet fixture carried by said coffee urn comprising a compressible and yielding member adapted to yieldingly grip said steam outlet nozzle on being pressed against the top wall of said urn recess.

CALOGERO GRADO.

References Cited in the file of this patent

UNITED STATES PATENTS

| Number | Name | Date |
|---|---|---|
| 67,932 | Walker | Aug. 20, 1867 |
| 124,454 | Smith | Mar. 12, 1872 |
| 374,603 | Krag | Dec. 13, 1887 |
| 561,515 | Morian | June 2, 1896 |
| 647,145 | Meyer | Apr. 10, 1900 |
| 873,980 | Barwise | Dec. 17, 1907 |
| 1,496,493 | Sell | June 3, 1924 |
| 1,756,737 | Goughnour | Apr. 29, 1930 |
| 1,953,291 | DeVry | Apr. 3, 1934 |
| 2,057,430 | Herrera | Oct. 13, 1936 |
| 2,088,966 | Lyons | Aug. 3, 1937 |
| 2,114,063 | Stoner | Apr. 12, 1938 |
| 2,206,424 | Oyen | July 2, 1940 |
| 2,210,126 | Risien et al. | Aug. 6, 1948 |
| 2,484,054 | Sharp | Oct. 11, 1949 |

FOREIGN PATENTS

| Number | Country | Date |
|---|---|---|
| 116,048 | Great Britain | May 30, 1918 |
| 267,502 | Italy | Sept. 9, 1929 |